United States Patent
Ma et al.

(10) Patent No.: US 11,976,931 B2
(45) Date of Patent: May 7, 2024

(54) METHOD AND APPARATUS FOR GUIDING VOICE-PACKET RECORDING FUNCTION, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Wentao Ma, Beijing (CN); Jizhou Huang, Beijing (CN); Jinyi Lei, Beijing (CN); Shiqiang Ding, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 49 days.

(21) Appl. No.: 17/254,814

(22) PCT Filed: May 25, 2020

(86) PCT No.: PCT/CN2020/092155
§ 371 (c)(1),
(2) Date: Dec. 21, 2020

(87) PCT Pub. No.: WO2021/098175
PCT Pub. Date: May 27, 2021

(65) Prior Publication Data
US 2022/0276067 A1    Sep. 1, 2022

(30) Foreign Application Priority Data

Nov. 20, 2019   (CN) .......................... 201911140137.6

(51) Int. Cl.
*G01C 21/36*      (2006.01)
*G10L 25/48*      (2013.01)

(52) U.S. Cl.
CPC .......... *G01C 21/3629* (2013.01); *G10L 25/48* (2013.01)

(58) Field of Classification Search
CPC ............ G01C 21/3629; G01C 21/3697; G06F 18/23213; G06F 18/2411; G06Q 30/0251;
(Continued)

(56) References Cited

U.S. PATENT DOCUMENTS

2001/0053956 A1* 12/2001 Ohishi ................... G01C 21/36
                                                                701/425
2009/0234565 A1    9/2009 Geelen
(Continued)

FOREIGN PATENT DOCUMENTS

CN    103093753 A    5/2013
CN    103674012 A    3/2014
(Continued)

OTHER PUBLICATIONS

Notice of Reasons for Refusal to Japanese Patent Application 2021-515173 (English translated), placed into the record on May 24, 2022, retrieved from https://patentscope.wipo.int/search/en/detail.jsf?docId=JP350405426 (Year: 2022).*

(Continued)

*Primary Examiner* — Calvin Cheung
(74) *Attorney, Agent, or Firm* — Seed IP Law Group LLP

(57) ABSTRACT

The present application discloses a method and apparatus for guiding a voice-packet recording function, a device and a computer storage medium, and relates to the field of big data. An implementation includes identifying a target user with a voice-packet recording demand using historical map usage behaviors of map users; and identifying a scenario where the target user uses a client terminal, and if the scenario conforms to a voice-packet recording scenario, sending first guidance information of the voice-packet (Continued)

recording function to the client terminal. With the present application, accurate guidance of the voice-packet recording function is realized, and excessive disturbance in the user is reduced.

11 Claims, 5 Drawing Sheets

(58) Field of Classification Search
CPC ........ G06Q 50/10; G10L 25/48; G11B 20/00; G11C 7/16
See application file for complete search history.

(56) References Cited

U.S. PATENT DOCUMENTS

| | | | | |
|---|---|---|---|---|
| 2012/0062357 | A1* | 3/2012 | Slamka | .................. G01C 21/20 340/4.11 |
| 2013/0325481 | A1* | 12/2013 | Van Os | .............. G01C 21/3629 704/E21.001 |
| 2014/0365068 | A1 | 12/2014 | Burns et al. | |
| 2016/0110461 | A1 | 4/2016 | Lee et al. | |
| 2017/0053651 | A1* | 2/2017 | Lim | ......................... G10L 15/20 |
| 2017/0328734 | A1 | 11/2017 | Devkar et al. | |
| 2018/0373263 | A1 | 12/2018 | Gray | |

FOREIGN PATENT DOCUMENTS

| | | | | | |
|---|---|---|---|---|---|
| CN | 105606117 | A | * | 5/2016 | ............. G01C 21/36 |
| CN | 105606117 | A | | 5/2016 | |
| CN | 109886719 | A | * | 6/2019 | ............. G06Q 30/02 |
| CN | 109886719 | A | | 6/2019 | |
| CN | 110049079 | A | | 7/2019 | |
| CN | 110275692 | A | | 9/2019 | |
| JP | 2008-287193 | A | | 11/2008 | |
| JP | 2008287193 | A | * | 11/2008 | ............. G10L 15/22 |
| JP | 2010-078851 | A | | 4/2010 | |
| JP | 2019-008796 | A | | 1/2019 | |
| KR | 10-2010-0090907 | A | | 8/2010 | |
| KR | 10-2014-0098947 | A | | 8/2014 | |

OTHER PUBLICATIONS

English translation of the Written Opinion of the International Searching Authority for WO20211098175, placed into the record May 20, 2022, retrieved from https://patentscope.wipo.int/search/en/detail.jsf?docId=WO2021098175 (Year: 2022).*

Communication under Rule 71(3) EPC, dated Jun. 17, 2022, for European Application No. 20 820 758.9-1009, 36 pages.

Notice of Reasons for Rejection, dated May 24, 2022, for Japanese Application No. 2021-515173, 10 pages (With English Translation).

Korean Notice of Allowance, dated Aug. 29, 2022, for Korean Application No. 10-2021-7008183, 4 pages (With English Translation).

Korean Office Action, dated Feb. 27, 2022, for Korean Application No. 10-2021-7008183, 12 pages (With English Translation).

Chinese Office Action dated Jul. 10, 2023, for the corresponding Chinese Patent Application No. 201911140137.6, 12 pages. (With English Translation).

* cited by examiner

METHOD AND APPARATUS FOR GUIDING VOICE-PACKET RECORDING FUNCTION, DEVICE AND COMPUTER STORAGE MEDIUM

The present application claims priority to Chinese Patent Application No. 201911140137.6, entitled "Method and Apparatus for Guiding Voice-Packet Recording Function, Device and Computer Storage Medium", filed on Nov. 20, 2019.

FIELD OF THE DISCLOSURE

The present application relates to the technical field of computer applications, and particularly to a method and apparatus for guiding a voice-packet recording function, a device and a computer storage medium in the technical field of big data.

BACKGROUND OF THE DISCLOSURE

This section is intended to provide a background or context for implementations of the present disclosure which are recited in the claims. The description herein is not admitted to be the prior art by inclusion in this section.

With the continuous development of computer technologies and the continuous increase of requirements of people for products, a voice broadcasting function of providing sounds of different speakers in a computer application product using a voice synthesis technology appears. For example, in a map product, a user may select sounds of different speakers provided by the map product to broadcast a navigation voice. Usually, these speakers are celebrities, such as movie actors, crosstalk comedians, singers, or the like. However, with the increasing personalized demand of the user, a few map applications have a recording function for providing a personalized voice packet for the user. The user is able to record sounds of himself, a family member, a friend, or the like, as the voice packet, and the sounds thereof are generated in the voice broadcasting process.

However, recording the personalized voice packet is a brand-new and advanced function on which most users lack cognition, in traditional promotion methods, such as promotion as screen-on information, pushing of promotion information to the users, or the like, the function is promoted to the vast number of users with a full quantity at the same time, all the users may frequently receive such promotion information, putting accuracy is poor, and some users may be disturbed excessively.

SUMMARY OF THE DISCLOSURE

In view of this, the present application is intended to reduce excessive disturbance to a user by promotion information.

In a first aspect, the present application provides a method for guiding a voice-packet recording function, including:

identifying a target user with a voice-packet recording demand using historical map usage behaviors of map users; and identifying a scenario where the target user uses a client terminal, and if the scenario conforms to a voice-packet recording scenario, sending first guidance information of the voice-packet recording function to the client terminal.

According to a preferred implementation of the present application, the identifying a target user with a voice-packet recording demand using historical map usage behaviors of map users includes:

extracting behavior features from the historical map usage behaviors of the map users to obtain feature vectors of the map users; and identifying the map users by a pre-trained first classification model based on the feature vectors of the map users to obtain an identification result whether the map users have the voice-packet recording demand.

According to a preferred implementation of the present application, the identifying a target user with a voice-packet recording demand using historical map usage behaviors of users includes:

extracting behavior features from seed users in advance to obtain feature vectors of the seed users, and clustering the seed users based on the feature vectors of the seed users to obtain user clusters;

extracting behavior features from the historical map usage behaviors of the map users to obtain feature vectors of the map users;

determining whether the map users are clustered into the existing user clusters based on the feature vectors of the map users; and identifying the map user clustered into the existing user clusters as the target user with the voice-packet recording demand.

According to a preferred implementation of the present application, the feature vector further includes a basic user portrait.

According to a preferred implementation of the present application, the behavior feature includes at least one of a travel-related behavior, a voice usage behavior and a voice packet-related behavior;

the travel-related behavior includes time and position information of at least one of POI retrieval, navigation and location;

the voice usage behavior includes at least one of the frequency of using a voice function, the time of last usage and the used voice function;

the voice packet-related behavior includes at least one of the number of times a voice packet is used, the type of the used voice packet, a voice-packet recording state, the time of recording the voice packet most recently and the frequency of accessing a voice-packet recording page.

According to a preferred implementation of the present application, the identifying a scenario where the target user uses a client terminal includes:

acquiring information of the scenario where the target user uses the client terminal, and identifying the information of the scenario by a pre-trained second classification model to obtain an identification result whether the information of the scenario conforms to the voice-packet recording scenario.

According to a preferred implementation of the present application, the information of the scenario includes at least one of:

time information and position information of usage of the client terminal by the target user, the time of last POI retrieval, the time of last navigation, location at a resident position, the voice-packet recording state, the time of recording the voice packet most recently and response information of historical first guidance information.

According to a preferred implementation of the present application, the method further includes:

tracking and recording the voice-packet recording state of the user after acquiring the event of recording the voice packet by the user.

According to a preferred implementation of the present application, the method further includes:

sending second guidance information to the user according to the voice-packet recording state of the user.

In a second aspect, the present application provides an apparatus for guiding a voice-packet recording function, including:

a demand identifying unit configured to identify a target user with a voice-packet recording demand using historical map usage behaviors of map users;

a scenario identifying unit configured to identify a scenario where the target user uses a client terminal; and a first guiding unit configured to, if the scenario where the target user uses the client terminal conforms to a voice-packet recording scenario, send first guidance information of the voice-packet recording function to the client terminal.

In a third aspect, the present application provides an electronic device, including:

at least one processor; and a memory connected with the at least one processor communicatively;

wherein the memory stores instructions executable by the at least one processor to cause the at least one processor to perform the method as mentioned above.

In a fourth aspect, the present application provides a non-transitory computer readable storage medium with computer instructions stored thereon, wherein the computer instructions are used for causing a computer to perform the method as mentioned above.

From the above technical solution, the method and apparatus, the device as well as the computer storage medium according to the present application may have the following advantages.

1) In the present application, the target user with the voice-packet recording demand is identified with the historical map usage behaviors, the scenario where the target user uses the client terminal is identified, and the guidance information of the voice-packet recording function is sent to the user in the scenario conforming to the voice-packet recording scenario, thereby realizing accurate guidance and reducing the excessive disturbance in the user.

2) Compared with traditional celebrity endorsement or ground promotion, the accurate guidance realized in the client terminal in the present application greatly reduces a cost and improves a conversion rate.

3) In the present application, the voice-packet recording state of the user is tracked, recorded and used for subsequent identification of the user demand and the scenario, thereby realizing continuous guidance of the user and optimizing the identification of the user demand and the scenario.

4) In the present application, the guidance information may be further sent to the user according to the voice-packet recording state of the user, thereby achieving recording encouragement and recording process guidance of the user.

Other effects of the above-mentioned alternatives will be described below in conjunction with embodiments.

BRIEF DESCRIPTION OF DRAWINGS

The drawings are used for better understanding the present solution and do not constitute a limitation of the present application. In the drawings.

DETAILED DESCRIPTION OF PREFERRED EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Figure 1:
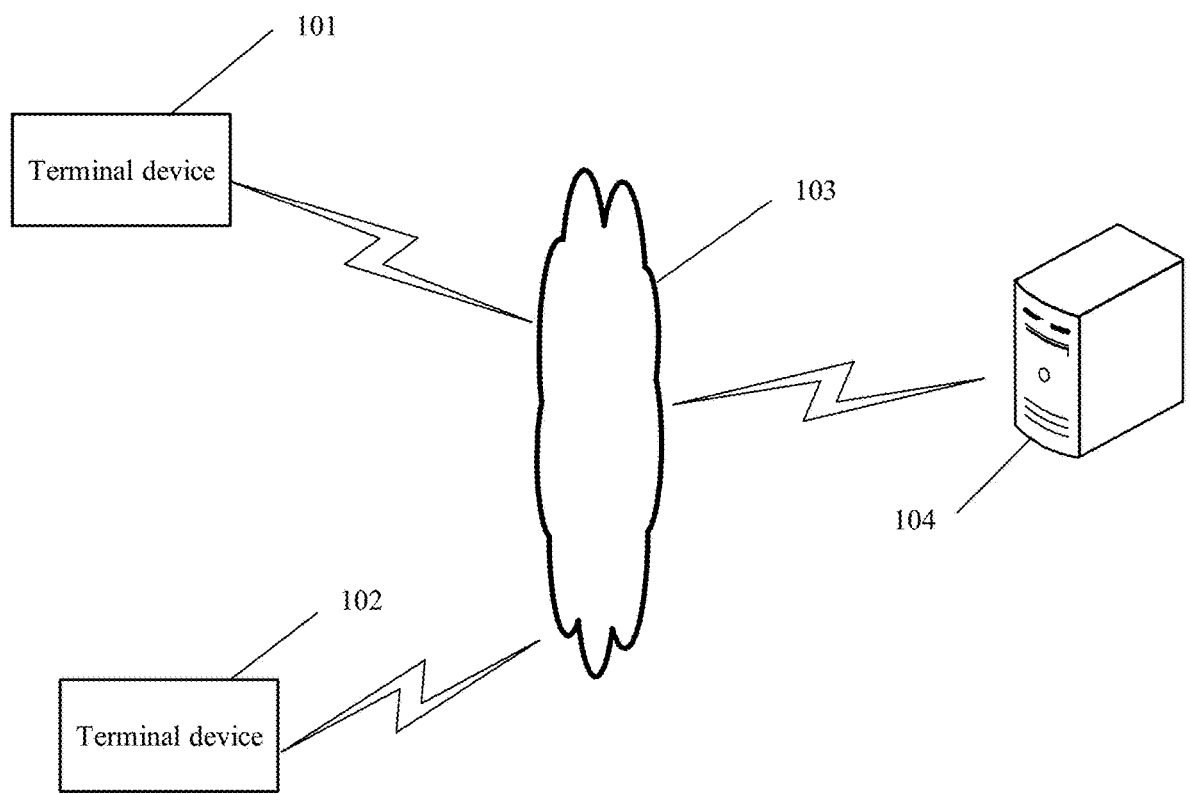
FIG. 1 shows an exemplary system architecture to which embodiments of the present application may be applied.

FIG. 1 shows an exemplary system architecture to which a method or apparatus for guiding a voice-packet recording function according to embodiments of the present application may be applied.

As shown in FIG. 1, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a voice interaction application, a map application, a web browser application, a communication application, or the like, may be installed on the terminal devices 101, 102.

The terminal devices 101, 102 may be configured as various electronic devices which support voice recording (that is, are able to collect voice data recorded by a user) and voice broadcasting operations, including, but not limited to, smart phones, tablets, notebook computers, or the like. The apparatus for guiding a voice-packet recording function according to the present application may be provided and run in the above-mentioned server 104. The apparatus may be implemented as a plurality of pieces of software or a plurality of software modules (for example, for providing distributed service), or a single piece of software or a single software module, which is not specifically limited herein. The server 104 may record historical usage behaviors of the map application by the user through a client terminal on the terminal device 101 or 102, and send guidance information of the voice-packet recording function to the client terminal based on the historical usage behaviors.

The server 104 may be configured as a single server or a server group including a plurality of servers. It should be understood that the numbers of the terminal devices, the network, and the server in FIG. 1 are merely schematic. There may be any number of terminal devices, networks and servers as desired for an implementation.

A core idea of the present application includes identifying a user with a voice-packet recording demand using historical map usage behaviors of users; and identifying a scenario where the user with the voice-packet recording demand uses a client terminal, and if the scenario conforms to a preset voice-packet recording scenario, sending guidance information of the voice-packet recording function to the client terminal. That is, the user is identified in terms of demands and scenarios, and only the user with the voice-packet recording demand is guided in the voice-packet recording scenario, thereby reducing excessive disturbance of promotion information in the user. A method according to the present application will be described below in detail with embodiments.

Figure 2:
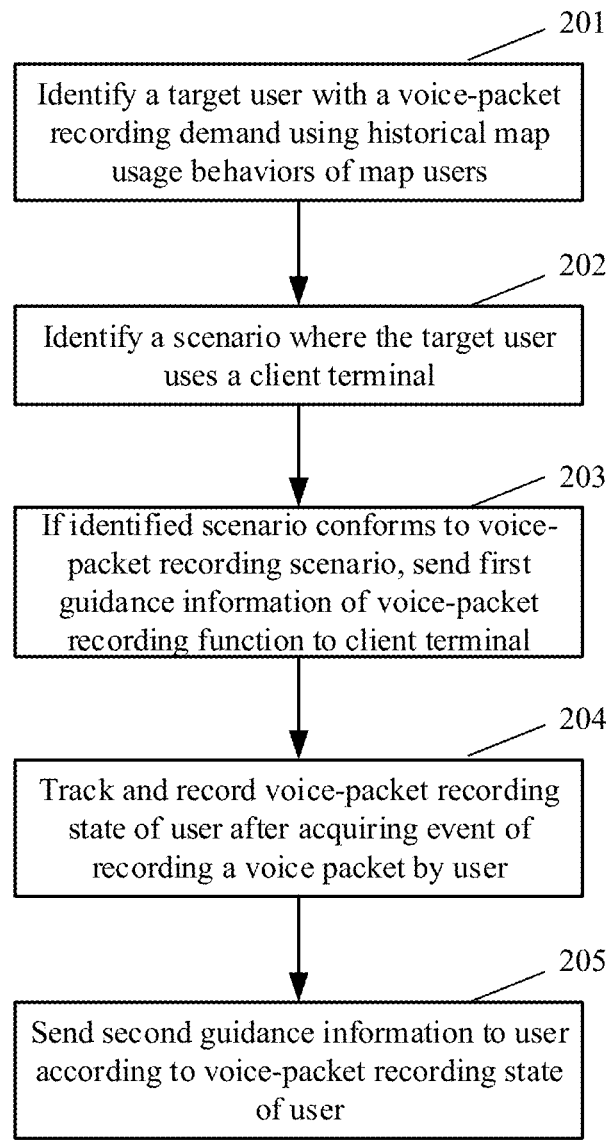
FIG. 2 is a flow chart of a method according to an embodiment of the present application.

FIG. 2 is a flow chart of a method according to an embodiment of the present application, and as shown in FIG. 2, the method may include the following steps:

in 201, identifying a target user with a voice-packet recording demand using historical map usage behaviors of map users.

Usually, the number of users of an application product, particularly a popular application, is great. If the voice-packet recording function is promoted to all users as in the prior art, users without such a demand are disturbed inevitably.

In this step, the target user is screened, and the adopted ways may include, but not limited to, the following two ways:

the first way: extracting behavior features from the historical map usage behaviors of the map users to obtain feature vectors of the map users; and identifying the map users by a pre-trained first classification model based on the feature vectors of the map users to obtain an identification result whether the map users have the voice-packet recording demand.

In the above-mentioned way, in addition to the behavior feature, the feature vector may further include a basic user portrait. The basic user portrait may include age, gender, work, or the like.

The following description focuses on the behavior feature. In the present application, the extracted behavior feature may include, but not limited to, at least one of a travel-related behavior, a voice usage behavior and a voice packet-related behavior.

The travel-related behavior may include time and position information of at least one of POI retrieval, navigation and location. Usually, a user possibly using the voice-packet recording function may have some features in the map usage behavior, for example, a parent may use the voice-packet recording function to record sounds of his child as a voice packet, which may show positioning data of a kindergarten in the morning and evening, navigation to a training class at weekends, retrieval of a place suitable for play with the child, or the like. For example, a college student may record sounds of himself or his lover as the voice packet, which may show location at a certain college in most time. Therefore, the time and position information of POI retrieval, navigation and location may greatly reflect whether the user is the target user of the voice-packet recording function.

The voice usage behavior may include at least one of the frequency of using a voice function, the time of last usage and the used voice function. For example, users who often use a navigation broadcasting function may be the target users who potentially use the voice-packet recording function. For another example, users who often use a map by means of voice interaction may also be the target users who potentially use the voice-packet recording function.

The voice packet-related behavior includes at least one of the number of times a voice packet is used, the type of the used voice packet, a voice-packet recording state, the time of recording the voice packet most recently and the frequency of accessing a voice-packet recording page. For example, users willing to use various voice packets and having rich voice-packet usage histories are likely to be willing to record the voice packets by themselves. For another example, users who have used the voice-packet recording function but have not recorded new voice packets for a long time may be guided to record new voice packets. For another example, users who do not finishing recording voice packets last time are likely to be guided to finishing the recording of the voice packets.

After extracted for the map user, the behavior feature and the basic user portrait are encoded or mapped to obtain corresponding feature vectors which are further spliced to obtain the feature factor of the map user.

The feature vector of the map user is input into a pre-trained classification model which outputs a classification result based on the feature vector, i.e., whether the map user has the voice-packet recording demand.

When the classification model is trained, positive samples and negative samples may be determined in advance by means of offline visits and telephone return visits; or the positive and negative samples are determined by online sending first guidance information to users in a small range to observe whether the users respond to the first guidance information. Then, behavior features are extracted from historical map usage behaviors of the users of the positive samples to obtain feature vectors of the users of the positive samples, and behavior features are extracted from historical map usage behaviors of the users of the negative samples to obtain feature vectors of the users of the negative samples, thereby training the classification model. The determination way of the feature vectors of the users of the positive and negative samples is consistent with the above-mentioned determination way of the feature vectors of the map users, and is not repeated herein. The classification model may be configured as a support vector machine (SVM), a logistic regression (LR) model, or the like.

The second way: extracting behavior features from seed users in advance to obtain feature vectors of the seed users, and clustering the seed users based on the feature vectors of the seed users to obtain user clusters; extracting behavior features from the historical map usage behaviors of the map users to obtain feature vectors of the map users; determining whether the map users are clustered into the existing user clusters based on the feature vectors of the map users; and identifying the map user clustered into the existing user clusters as the target user with the voice-packet recording demand.

A group of users who have used the voice-packet recording function may be predetermined as the seed users, and the feature vectors may be extracted from these seed users. The extraction way of the feature vectors is the same as the above-mentioned way, and is not repeated. The seed users are clustered based on the feature vectors of the seed users to obtain the user clusters which actually represent some typical user categories, and users in these user categories are likely to use the voice-packet recording function. After each user cluster is obtained, the feature vectors of this category may be calculated uniformly, whether the map users are clustered into the existing user clusters is determined based on the feature vectors of the map users, and the map user which may be clustered into the existing user clusters belongs to these typical user categories, and is likely to use the voice-packet recording function. The map user which is unable to be clustered into the existing user clusters does not belong to these typical user categories, and is unlikely to use the voice-packet recording function.

The clustering method used in the above-mentioned clustering process is not limited in the present application, and may be a K-means clustering algorithm, an expectation maximization (EM) algorithm, or the like.

In 202, identifying a scenario where the target user uses a client terminal.

The voice-packet recording operation has a harsh environment requirement, is unable to be performed in the environment with high noise, and has a long recording time, which requires the user to have free time. However, since the users have different behavior rules, not all the users are suitable for being guided in the same scenario, and therefore, an existing way of performing a pushing operation for all the users at the same time is not correct, and is prone to disturb the users excessively. In view of this, a scenario identification mechanism is introduced in the embodiment of the present application.

In this step, a simple scenario identification way may be adopted to judge whether the current time and position of usage of the client terminal by the target user belong to the preset voice-packet recording scenario. For example, whether the current time is eight in the evening or the weekend and whether the user is positioned at home are judged.

However, in addition to the above-mentioned simple judgment with time and position as rules, the usage of information of the scenario is required to be richer and deeper in consideration of the complexity of behavior habits of the users. Therefore, the present application provides a preferred way of identifying the scenario, including:

acquiring information of the scenario where the target user uses the client terminal, and identifying the information of the scenario by a pre-trained second classification model to obtain an identification result whether the information of the scenario conforms to the voice-packet recording scenario. The acquired information of the scenario may include one or any combination of the following information:

time information and position information of usage of the client terminal by the target user, the time of last POI retrieval, the time of last navigation, location at a resident position, the voice-packet recording state, the time of recording the voice packet most recently, response information of historical first guidance information, or the like.

When the second classification model is trained, positive samples and negative samples may be determined by online sending the first guidance information to users in a small range to observe whether the users respond to the first guidance information. Then, information of scenarios of the users of the positive and negative samples is acquired to train the classification model. The acquisition way of the information of the scenarios of the users of the positive and negative samples is consistent with the above-mentioned acquisition way of the information of the scenario of the target user.

In addition, it should be noted that in the present embodiment, the terms "first" and "second" in the terms "first classification model", "second classification model", "first guidance information", "second guidance information", or the like, do not have the meaning of a number, an order, or the like, but merely make a name distinction.

In 203, if the identified scenario conforms to the voice-packet recording scenario, sending first guidance information of the voice-packet recording function to the client terminal.

Figure 3:
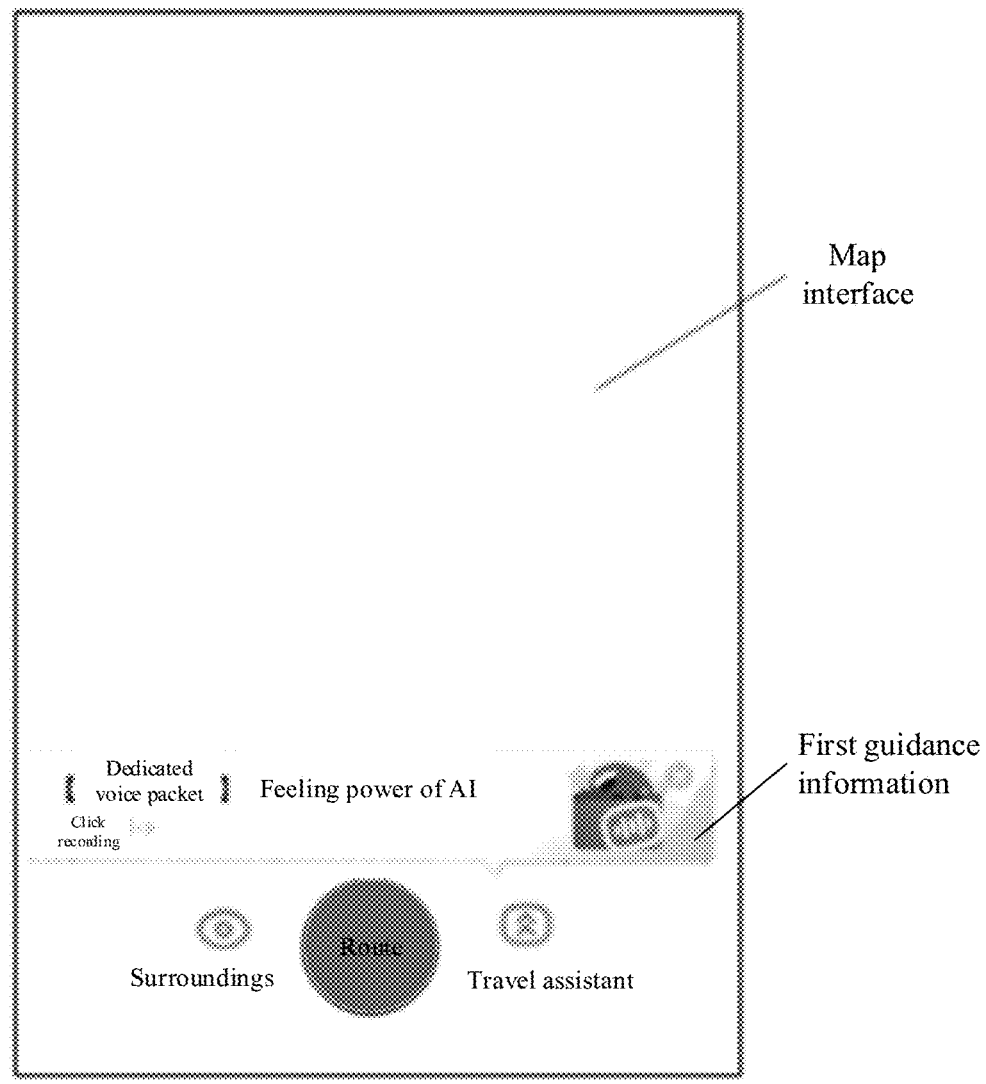
FIG. 3 is a schematic diagram of first guidance information according to an embodiment of the present application.

The first guidance information may be one or any combination of a text, a picture, a page component, a link, or the like. The user may conveniently access a voice-packet recording page to record voices with the first guidance information. For example, as shown in FIG. 3, a combination of the component and the text, the picture and the link may be displayed on an interface of the client terminal to show the first guidance information. When the user clicks "click recording" in the interface, the interface is jumped to the voice-packet recording page.

In 204, tracking and recording the voice-packet recording state of the user after acquiring the event of recording the voice packet by the user.

The tracking and recording operations of the voice-packet recording state of the user may be used for both the later identification of the user demand and the scenario (i.e., an updating operation of the behavior features of the user and the scenario features) and execution of step 205.

In 205, sending second guidance information to the user according to the voice-packet recording state of the user.

In the application, different documents may be pre-configured according to different recording states, and text information, voice information, or the like, of the corresponding document are sent to the user as the second guidance information according to the voice-packet recording state of the user.

For example, if the user still has 5 sentences to be recorded, a voice "victory is in sight, go for it" may be sent to the user. If the user finishes the recording operation, voices "great, recording is finished, and the voice packet may be downloaded after 15 minutes", or the like, may be sent to the user. Such guidance information may encourage the user, assist a child, or the like, in finishing the recording operation at once, and also enable users who are not familiar with the recording process to learn the next step.

The above is a detailed description of the method according to the present application. An apparatus according to the present application will be described below in detail in conjunction with an embodiment.

Figure 4:
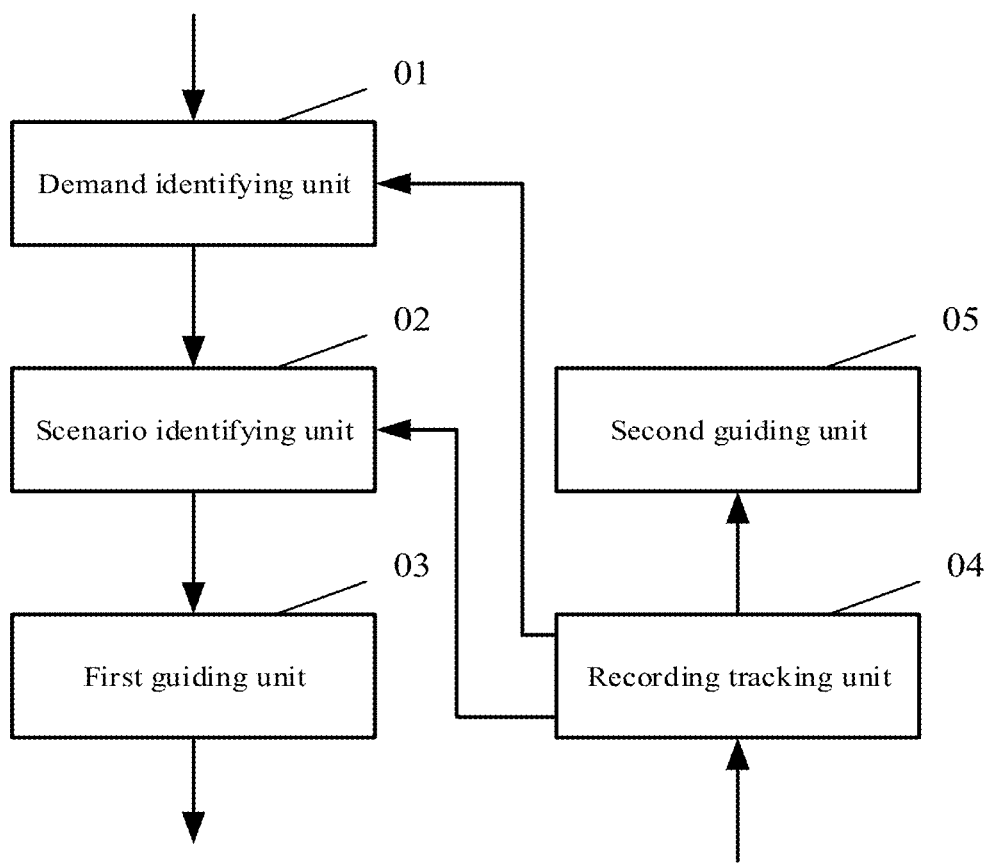
FIG. 4 is a structural diagram of an apparatus according to an embodiment of the present application.

FIG. 4 is a structural diagram of an apparatus according to the embodiment of the present application, and as shown in FIG. 4, the apparatus may include a demand identifying unit 01, a scenario identifying unit 02 and a first guiding unit 03, and may further include a recording tracking unit 04 and a second guiding unit 05. The main functions of each constitutional unit are as follows.

The demand identifying unit 01 is configured to identify a target user with a voice-packet recording demand using historical map usage behaviors of map users.

The demand identifying unit 01 may adopt, but not limited to, the two following ways:

the first way: extracting behavior features from the historical map usage behaviors of the map users to obtain feature vectors of the map users; and identifying the map users by a pre-trained first classification model based on the feature vectors of the map users to obtain an identification result whether the map users have the voice-packet recording demand.

The second way: extracting behavior features from seed users in advance to obtain feature vectors of the seed users, and clustering the seed users based on the feature vectors of the seed users to obtain user clusters; extracting behavior features from the historical map usage behaviors of the map users to obtain feature vectors of the map users; determining whether the map users are clustered into the existing user clusters based on the feature vectors of the map users; and identifying the map user clustered into the existing user clusters as the target user with the voice-packet recording demand.

The above-mentioned behavior feature may include at least one of a travel-related behavior, a voice usage behavior and a voice packet-related behavior.

The travel-related behavior includes time and position information of at least one of POI retrieval, navigation and location. The voice usage behavior includes at least one of the frequency of using a voice function, the time of last usage and the used voice function. The voice packet-related behavior includes at least one of the number of times a voice packet is used, the type of the used voice packet, a voice-packet recording state, the time of recording the voice packet most recently and the frequency of accessing a voice-packet recording page.

In the above-mentioned way, in addition to the behavior feature, the feature vector may further include a basic user portrait. The basic user portrait may include age, gender, work, or the like. After extracted for the map user, the behavior feature and the basic user portrait are encoded or mapped to obtain corresponding feature vectors which are further spliced to obtain the feature factor of the map user.

In addition, corresponding to the above-mentioned first way, the apparatus may further include a first model training unit (not shown) configured to acquire training samples; when the training samples are acquired, positive samples and negative samples may be determined in advance by means of offline visits and telephone return visits; or the positive and negative samples are determined by online sending first guidance information to users in a small range to observe whether the users respond to the first guidance information. Then, behavior features are extracted from historical map usage behaviors of the users of the positive samples to obtain feature vectors of the users of the positive samples, and behavior features are extracted from historical map usage behaviors of the users of the negative samples to obtain feature vectors of the users of the negative samples, thereby training the classification model to obtain the first classification model.

The scenario identifying unit 02 is configured to identify a scenario where the target user uses a client terminal.

Specifically, the scenario identifying unit 02 may acquire information of the scenario where the target user uses the client terminal, and identify the information of the scenario by a pre-trained second classification model to obtain an identification result whether the information of the scenario conforms to the voice-packet recording scenario.

The above-mentioned information of the scenario may include at least one of: time information and position information of usage of the client terminal by the target user, the time of last POI retrieval, the time of last navigation, location at a resident position, the voice-packet recording state, the time of recording the voice packet most recently and response information of historical first guidance information.

Correspondingly, the apparatus may further include a second model training unit (not shown) configured to acquire training samples; for example, positive samples and negative samples may be determined by online sending the first guidance information to users in a small range to observe whether the users respond to the first guidance information. Then, information of scenarios of the users of the positive and negative samples is acquired to train the classification model to obtain the second classification model.

The first guiding unit 03 is configured to, if the scenario where the target user uses the client terminal conforms to a voice-packet recording scenario, send first guidance information of the voice-packet recording function to the client terminal.

The first guidance information may be one or any combination of a text, a picture, a page component, a link, or the like. The user may conveniently access a voice-packet recording page to record voices with the first guidance information.

The recording tracking unit 04 is configured to track and record the voice-packet recording state of the user after acquiring the event of recording the voice packet by the user.

The second guiding unit 05 is configured to send second guidance information to the user according to the voice-packet recording state of the user. In the application, different documents may be pre-configured according to different recording states, and text information, voice information, or the like, of the corresponding document are sent to the user as the second guidance information according to the voice-packet recording state of the user.

According to the embodiments of the present application, there are also provided an electronic device and a readable storage medium.

Figure 5:
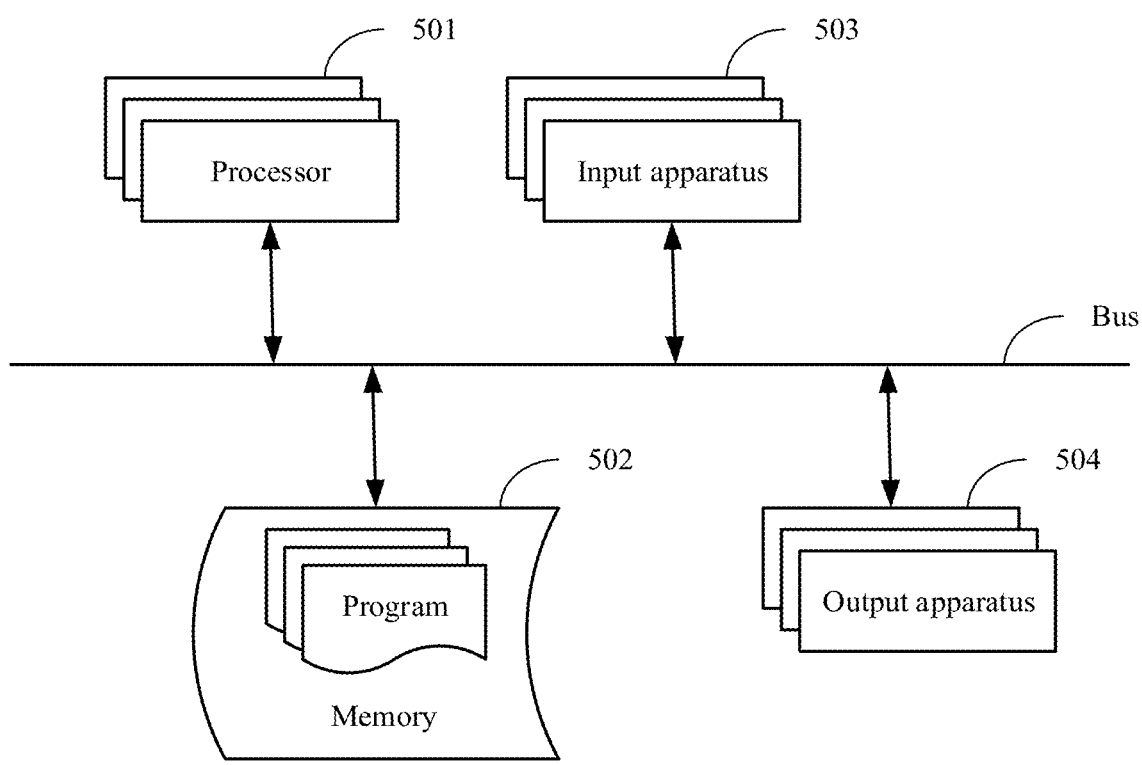
FIG. 5 is a block diagram of an electronic device configured to implement the embodiments of the present application.

FIG. 5 is a block diagram of an electronic device for the method according to the embodiment of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 5, the electronic device includes one or more processors 501, a memory 502, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 5, one processor 501 is taken as an example.

The memory 502 is configured as the non-transitory computer readable storage medium according to the present application. The memory stores instructions executable by the at least one processor to cause the at least one processor to perform a method according to the present application. The non-transitory computer readable storage medium according to the present application stores computer instructions for causing a computer to perform the method according to the present application.

The memory 502 which is a non-transitory computer readable storage medium may be configured to store non-transitory software programs, non-transitory computer executable programs and modules, such as program instructions/units corresponding to the method according to the embodiments of the present application. The processor 501 executes various functional applications and data processing of a server, that is, implements the method according to the above-mentioned embodiments, by running the non-transitory software programs, instructions, and modules stored in the memory 502.

The memory 502 may include a program storage area and a data storage area, wherein the program storage area may store an operating system and an application program required for at least one function; the data storage area may store data created according to use of the electronic device, or the like. Furthermore, the memory 502 may include a high-speed random access memory, or a non-transitory memory, such as at least one magnetic disk storage device, a flash memory device, or other non-transitory solid state storage devices. In some embodiments, optionally, the memory 502 may include memories remote from the processor 501, and such remote memories may be connected to the electronic device via a network. Examples of such a network include, but are not limited to, the Internet, intranets, local area networks, mobile communication networks, and combinations thereof.

The electronic device may further include an input apparatus 503 and an output apparatus 504. The processor 501, the memory 502, the input apparatus 503 and the output apparatus 504 may be connected by a bus or other means, and FIG. 5 takes the connection by a bus as an example.

The input apparatus 503 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output apparatus 504 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for guiding a voice-packet recording function, comprising:
   extracting behavior features from seed users in advance to obtain feature vectors of the seed users, and clustering the seed users based on the feature vectors of the seed users to obtain user clusters;
   extracting behavior features from historical map usage behaviors of map users to obtain feature vectors of the map users;
   determining whether the map users are clustered into existing user clusters based on the feature vectors of the map users;

identifying the map users clustered into the existing user clusters as a target user with a voice-packet recording demand;

identifying a scenario where the target user uses a client terminal, and if the scenario conforms to a voice-packet recording scenario, sending first guidance information in a form of one or any combination of a text, a picture, a page component, a link for a voice-packet recording function to the client terminal, wherein the first guidance information is used to access a voice-packet recording page to record voices;

tracking and recording a voice-packet recording state of the target user after acquiring a recording of a voice packet by the target user; and sending second guidance information in the form of text information or voice information to the target user according to the voice-packet recording state of the target user, wherein the second guidance is used to guide the target user during the recording process.

2. The method according to claim 1, wherein the feature vector further comprises a basic user portrait.

3. The method according to claim 1, wherein the behavior feature comprises at least one of a travel-related behavior, a voice usage behavior and a voice packet-related behavior;
the travel-related behavior comprises time and position information of at least one of POI retrieval, navigation and location;
the voice usage behavior comprises at least one of the frequency of using a voice function, the time of last usage and the used voice function;
the voice packet-related behavior comprises at least one of the number of times a voice packet is used, the type of the used voice packet, a voice-packet recording state, the time of recording the voice packet most recently and the frequency of accessing a voice-packet recording page.

4. The method according to claim 2, wherein the behavior feature comprises at least one of a travel-related behavior, a voice usage behavior and a voice packet-related behavior;
the travel-related behavior comprises time and position information of at least one of POI retrieval, navigation and location;
the voice usage behavior comprises at least one of the frequency of using a voice function, the time of last usage and the used voice function;
the voice packet-related behavior comprises at least one of the number of times a voice packet is used, the type of the used voice packet, a voice-packet recording state, the time of recording the voice packet most recently and the frequency of accessing a voice-packet recording page.

5. The method according to claim 1, wherein the identifying a scenario where the target user uses a client terminal comprises:
acquiring information of the scenario where the target user uses the client terminal, and identifying the information of the scenario by a pre-trained second classification model to obtain an identification result whether the information of the scenario conforms to the voice-packet recording scenario.

6. The method according to claim 5, wherein the information of the scenario comprises at least one of:
time information and position information of usage of the client terminal b y the target user, the time of last POI retrieval, the time of last navigation, location at a resident position, the voice-packet recording state, the time of recording the voice packet most recently and response information of historical first guidance information.

7. An electronic device, comprising:
at least one processor; and
a memory communicatively connected with the at least one processor;
wherein the memory stores instructions executed by the at least one processor, such that the at least one processor is programmed to:
extract behavior features from seed users in advance to obtain feature vectors of the seed users, and cluster the seed users based on the feature vectors of the seed users to obtain user clusters;
extract behavior features from historical map usage behaviors of map users to obtain feature vectors of the map users;
determine whether the map users are clustered into existing user clusters based on the feature vectors of the map users;
identify the map users clustered into the existing user clusters as a target user with a voice-packet recording demand;
identify a scenario where the target user uses a client terminal, and if the scenario conforms to a voice-packet recording scenario, send first guidance information in a form of one or any combination of a text, a picture, a page component, a link for a voice-packet recording function to the client terminal, wherein the first guidance information is used to access a voice-packet recording page to record voices;
track and record a voice-packet recording state of the target user after acquiring a recording of a voice packet by the target user; and
send second guidance information in the form of text information or voice information to the target user according to the voice-packet recording state of the target user, wherein the second guidance is used to guide the target user during the recording process.

8. The electronic device according to claim 7, wherein the behavior feature comprises at least one of a travel-related behavior, a voice usage behavior and a voice packet-related behavior;
the travel-related behavior comprises time and position information of at least one of POI retrieval, navigation and location;
the voice usage behavior comprises at least one of the frequency of using a voice function, the time of last usage and the used voice function;
the voice packet-related behavior comprises at least one of the number of times a voice packet is used, the type of the used voice packet, a voice-packet recording state, the time of recording the voice packet most recently and the frequency of accessing a voice-packet recording page.

9. The electronic device according to claim 7, wherein the identifying a scenario where the target user uses a client terminal comprises:
acquiring information of the scenario where the target user uses the client terminal, and identifying the information of the scenario by a pre-trained second classification model to obtain an identification result whether the information of the scenario conforms to the voice-packet recording scenario.

10. The electronic device according to claim 9, wherein the information of the scenario comprises at least one of:
time information and position information of usage of the client terminal by the target user, the time of last POI retrieval, the time of last navigation, location at a resident position, the voice-packet recording state, the time of recording the voice packet most recently and response information of historical first guidance information.

11. A non-transitory computer-readable storage medium storing computer instructions therein, wherein the computer instructions are used to cause the computer to perform a method for guiding a voice-packet recording function, wherein the method for guiding a voice-packet recording function comprises:
extracting behavior features from seed users in advance to obtain feature vectors of the seed users, and clustering the seed users based on the feature vectors of the seed users to obtain user clusters;
extracting behavior features from historical map usage behaviors of map users to obtain feature vectors of the map users;
determining whether the map users are clustered into existing user clusters based on the feature vectors of the map users;
identifying the map users clustered into the existing user clusters as a target user with a voice-packet recording demand;
identifying a scenario where the target user uses a client terminal, and if the scenario conforms to a voice-packet recording scenario, sending first guidance information in a form of one or any combination of a text, a picture, a page component, a link for a voice-packet recording function to the client terminal, wherein the first guidance information is used to access a voice-packet recording page to record voices;
tracking and recording a voice-packet recording state of the target user after acquiring a recording of a voice packet by the target user; and
sending second guidance information in the form of text information or voice information to the target user according to the voice-packet recording state of the target user, wherein the second guidance is used to guide the target user during the recording process.

* * * * *